US012574244B2

(12) United States Patent
Liu et al.

(10) Patent No.: US 12,574,244 B2
(45) Date of Patent: Mar. 10, 2026

(54) DC-SCM AUTHENTICATION SYSTEM

(71) Applicant: Dell Products L.P., Round Rock, TX (US)

(72) Inventors: Wei Liu, Austin, TX (US); Po-Yu Cheng, Tainan (TW)

(73) Assignee: Dell Products L.P., Round Rock, TX (US)

( * ) Notice: Subject to any disclaimer, the term of this patent is extended or adjusted under 35 U.S.C. 154(b) by 203 days.

(21) Appl. No.: 18/506,259

(22) Filed: Nov. 10, 2023

(65) Prior Publication Data

US 2025/0158826 A1 May 15, 2025

(51) Int. Cl.
*H04L 9/32* (2006.01)
*H04L 9/30* (2006.01)

(52) U.S. Cl.
CPC .............. *H04L 9/3234* (2013.01); *H04L 9/30* (2013.01)

(58) Field of Classification Search
CPC ................................ H04L 9/3234; H04L 9/30
USPC ......................................................... 713/155
See application file for complete search history.

(56) References Cited

U.S. PATENT DOCUMENTS

| | | | |
|---|---|---|---|
| 10,534,620 B2 | 1/2020 | Samuel et al. | |
| 10,880,099 B2 * | 12/2020 | Kumar Ujjwal ...... | G06F 21/577 |
| 2017/0249133 A1 * | 8/2017 | Herzi ................. | G06F 8/65 |
| 2018/0330093 A1 * | 11/2018 | Shivanna ............. | G06F 9/4401 |
| 2019/0384909 A1 * | 12/2019 | Ndu ................... | G06F 21/52 |
| 2023/0325509 A1 * | 10/2023 | Schroder ............. | G06F 21/64 |
| | | | 726/26 |

* cited by examiner

*Primary Examiner* — Moeen Khan
(74) *Attorney, Agent, or Firm* — Joseph Mencher

(57) ABSTRACT

A DC-SCM authentication system includes a DC-SCM authentication subsystem coupled to a DC-SCM device and a TPM device. The DC-SCM authentication subsystem retrieves a measured initialization process measurement generated by the TPM device during a first initialization process performed by the DC-SCM device, and retrieves a verified initialization process measurement that may be published by the DC-SCM device during or following the first initialization process as, for example a UEFI variable. The DC-SCM authentication subsystem then determines whether the measured initialization process measurement generated during by the TPM device the first initialization process does not match the verified initialization process measurement published by the DC-SCM device during or following the first initialization process and, if so, generates an unauthenticated DC-SCM device alert.

20 Claims, 13 Drawing Sheets

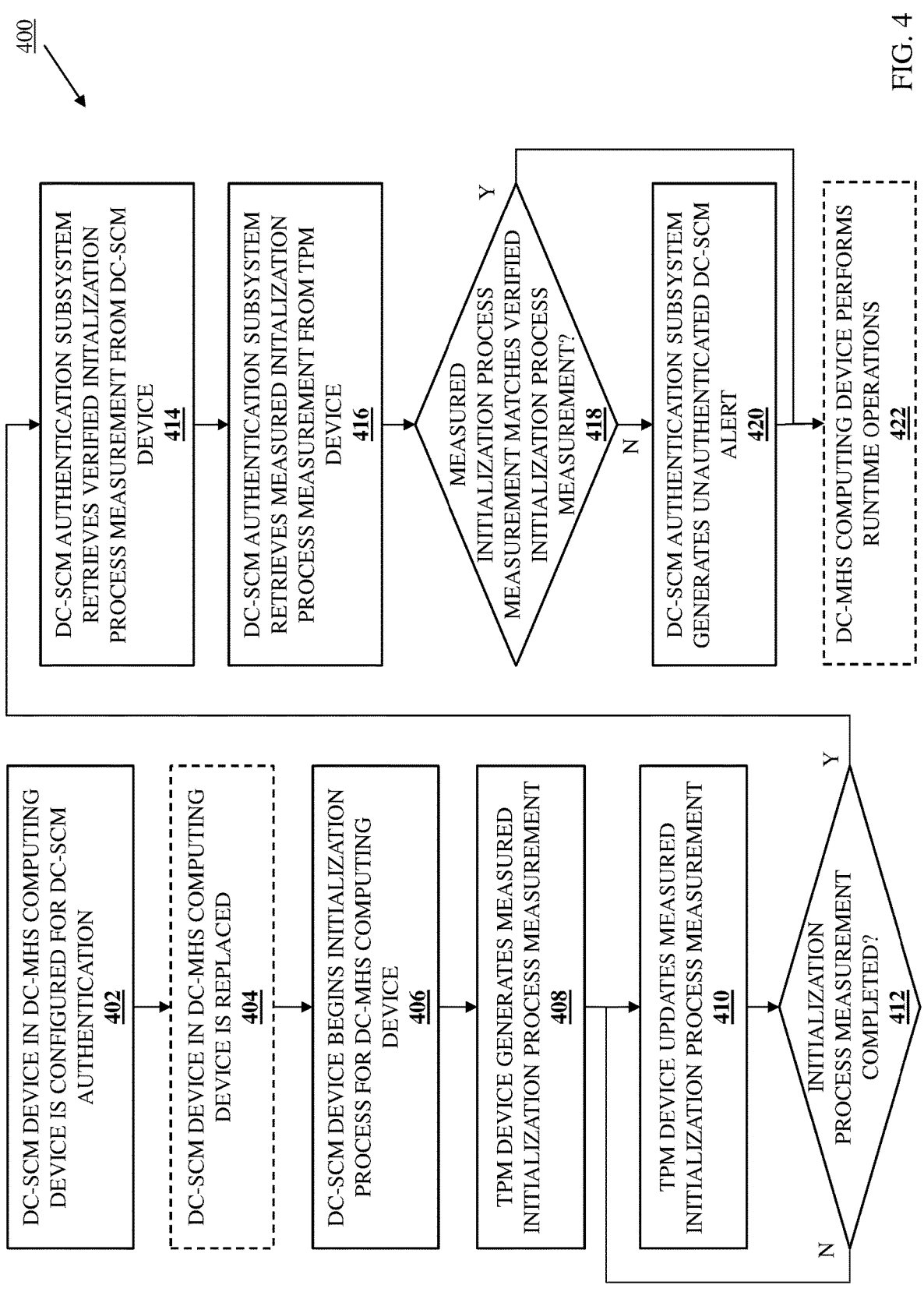

DC-SCM DEVICE IN DC-MHS COMPUTING DEVICE IS CONFIGURED FOR DC-SCM AUTHENTICATION
402

DC-SCM DEVICE IN DC-MHS COMPUTING DEVICE IS REPLACED
404

DC-SCM DEVICE BEGINS INITIALIZATION PROCESS FOR DC-MHS COMPUTING DEVICE
406

TPM DEVICE GENERATES MEASURED INITIALIZATION PROCESS MEASUREMENT
408

TPM DEVICE UPDATES MEASURED INITIALIZATION PROCESS MEASUREMENT
410

INITIALIZATION PROCESS MEASUREMENT COMPLETED?
412

N

Y

DC-SCM AUTHENTICATION SUBSYSTEM RETRIEVES VERIFIED INITIALIZATION PROCESS MEASUREMENT FROM DC-SCM DEVICE
414

DC-SCM AUTHENTICATION SUBSYSTEM RETRIEVES MEASURED INITIALIZATION PROCESS MEASUREMENT FROM TPM DEVICE
416

MEASURED INITIALIZATION PROCESS MEASUREMENT MATCHES VERIFIED INITIALIZATION PROCESS MEASUREMENT?
418

Y

N

DC-SCM AUTHENTICATION SUBSYSTEM GENERATES UNAUTHENTICATED DC-SCM ALERT
420

DC-MHS COMPUTING DEVICE PERFORMS RUNTIME OPERATIONS
422

300

300

DC-MHS COMPUTING DEVICE 306

902

NETWORK 304

902

MANAGEMENT SYSTEM 302

DC-SCM AUTHENTICATION SYSTEM

BACKGROUND

The present disclosure relates generally to information handling systems, and more particularly to authenticating a DataCenter Secure Control Module (DC-SCM) in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as server devices and other computing devices known in the art may be provided in configurations promulgated by the Open Compute Project (OCP) according to the DataCenter Modular Hardware System (DC-MHS) sub-project (referred to as "DC-MHS" configurations below). As will be appreciated by one of skill in the art in possession of the present disclosure, the DC-MHS sub-project attempts to standardize a collection of Host Processor Module (HPM) form-factors and corresponding components (e.g., Add-In Cards (AICs)) to allow interoperability of those HPMs with computing devices and other platforms. Such DC-MHS configurations utilize a DataCenter Secure Control Module (DC-SCM) that performs conventional Basic Input/Output System (BIOS) and Baseboard Management Controller (BMC) functionality to provide initialization, management, security and control functionality for the DC-MHS computing device via the DC-SCM rather than via a conventional BIOS and BMC device included on a conventional motherboard.

However, the utilization of DC-SCMs in DC-MHS computing devices raises some security issues. For example, DC-SCMs may be provided in DC-MHS computing devices as a DC-SCM circuit board (or other DC-SCM device) that supports the DC-SCM components of the DC-SCM, and that is relatively easy to remove from the DC-MHS computing device and replace. While a Baseboard Management Controller (BMC) in the computing device may be configured to perform security operations for the DC-MHS computing device that include authenticating the HPM in the DC-MHS computing device, there are no conventional techniques for authenticating the DC-SCM, allowing a "hacker" or other malicious actor to replace an authentic DC-SCM with a modified DC-SCM and, for example, gain access to data handled by the DC-MHS computing device.

Accordingly, it would be desirable to provide a DC-SCM authentication system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a DataCenter Secure Control Module (DC-SCM) authentication engine that is configured to: retrieve, from a Trusted Platform Module (TPM) device that is coupled to the processing system, a measured initialization process measurement generated by the TPM device during a first initialization process performed by a DC-SCM device that is coupled to the processing system; retrieve, from the DC-SCM device, a verified initialization process measurement published by the DC-SCM device during or following the first initialization process; determine that the measured initialization process measurement generating by the TPM device during the first initialization process does not match the verified initialization process measurement published by the DC-SCM device during or following the first initialization process; and generate, in response to determining that the measured initialization process measurement generated by the TPM device during the first initialization process does not match the verified initialization process measurement published by the DC-SCM device during or following the first initialization process, an unauthenticated DC-SCM device alert.

BRIEF DESCRIPTION OF THE DRAWINGS

FIG. 4 is a flow chart illustrating an embodiment of a method for authenticating a DC-SCM.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
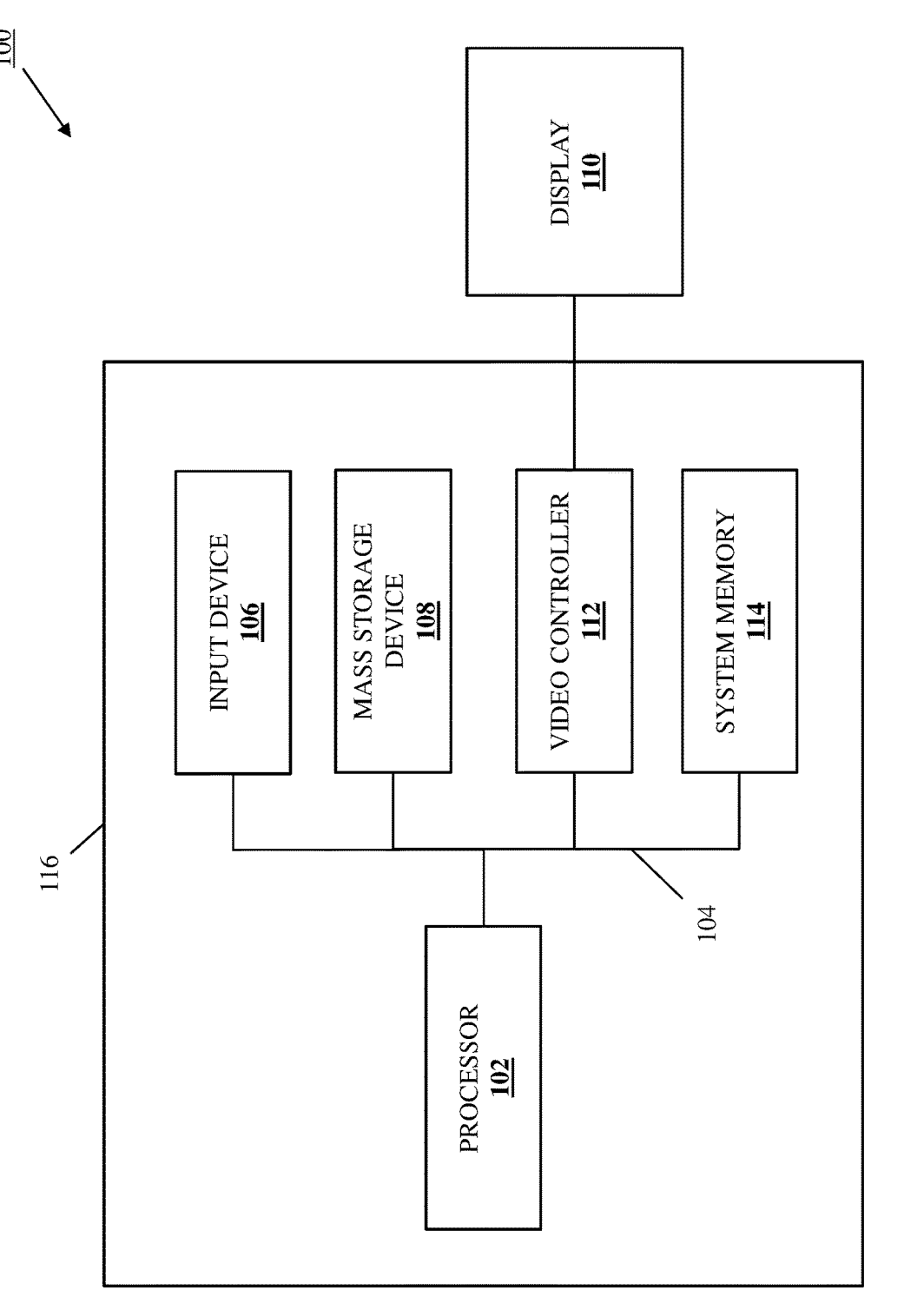
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
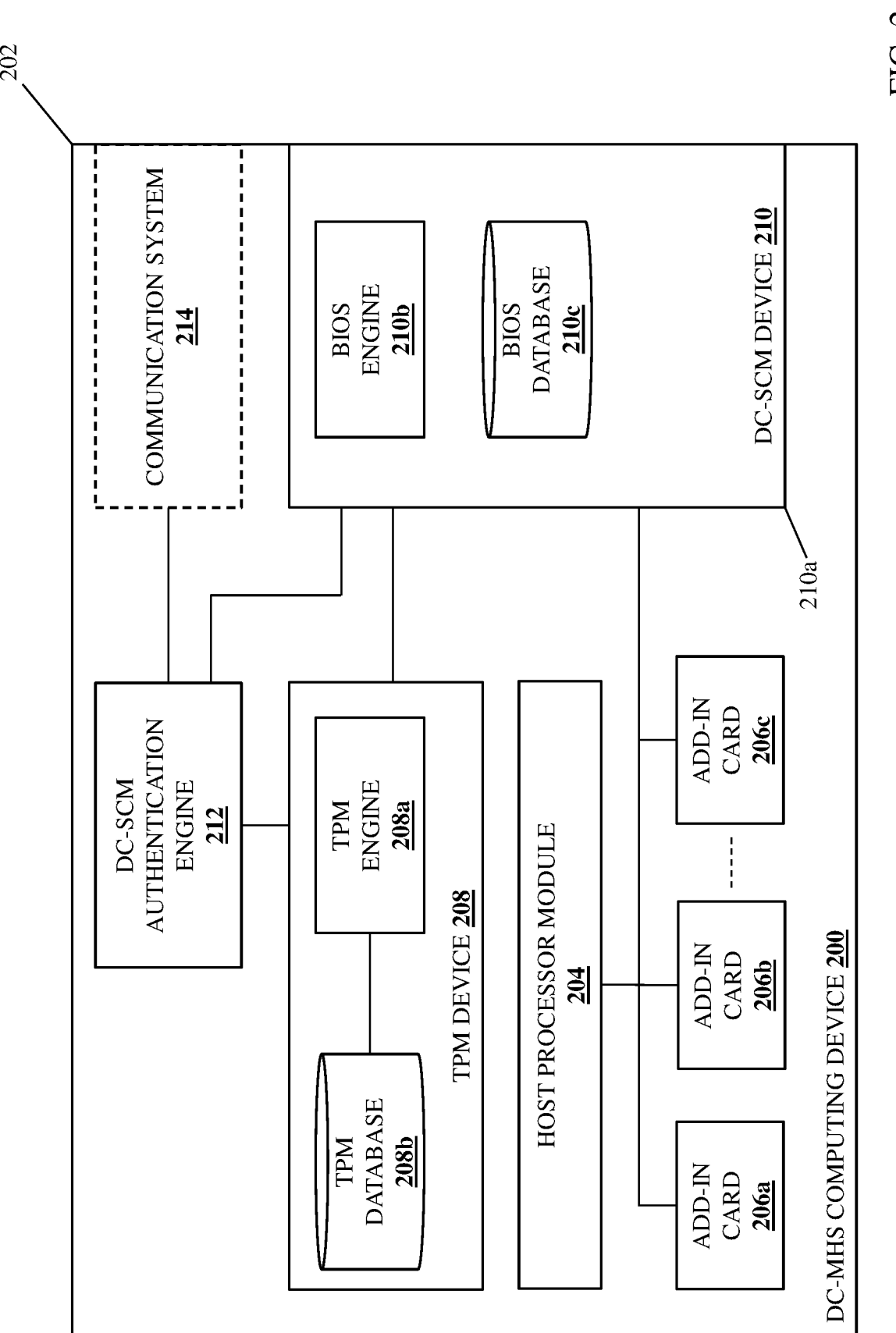
FIG. 2 is a schematic view illustrating an embodiment of a DC-MHS computing device that may provide the DC-SCM authentication system of the present disclosure.

Referring now to FIG. 2, an embodiment of a DataCenter Modular Hardware System (DC-MHS) computing device 200 is illustrated that may provide the DC-SCM authentication system of the present disclosure. In an embodiment, the DC-MHS computing device 200 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the DC-MHS computing device 200 discussed below may be provided by other devices that are configured to operate similarly as the DC-MHS computing device 200 discussed below.

In the illustrated embodiment, the DC-MHS computing device 200 includes a chassis 202 that houses the components of the DC-MHS computing device 200, only some of which are illustrated and discussed below. For example, the chassis 202 may house a Host Processing Module (HPM) 204 that one of skill in the art in possession of the present disclosure will appreciate may be provided by a standardized processing component that provides a modular building block of a DC-MHS configuration. In a specific example, the HPM 204 may include a HPM form-factor and HPM subsystems that are standardized according to the DC-MHS Revision 1 (R1) to provide interoperability of the HPM 204 with the DC-MHS computing device 200, although other HPMs are envisioned as falling within the scope of the present disclosure as well.

Furthermore, the chassis 402 may also house a plurality of Add-In Cards (AICs) 206a, 206b, and up to 206c, each of which may be coupled to the HPM 204, and each of which may be provided by standardized components that one of skill in the art in possession of the present disclosure will recognize provide modular building blocks of a DC-MHS configuration. For example, each of the AICs 206a-206c may provide a DC-MHS module that may be provided in the DC-MHS computing device 200 and may be coupled to the HPM 204 in order to provide the DC-MHS computing device 200 functionality enabled by that AIC. To provide some specific examples, the AICs 206a-206c may be included in a Data Processing Unit (DPU) system or Infrastructure Processing Unit (IPU) system that includes a programmable processor that integrates a general purpose Central Processing Unit (CPU) with network interface hardware, and may be configured to provide microservices functionality, networking functionality, encryption functionality, and/or any other functionality that would be apparent to one of skill in the art in possession of the present disclosure.

As illustrated, the chassis 202 may also house a Trusted Platform Module (TPM) device 208 that one of skill in the art in possession of the present disclosure will recognize may be provided according to the TPM standard for a secure crypto processor that provides a dedicated microcontroller configured to secure hardware in computing devices via integrated cryptographic keys, as well as perform any other TPM functionality that would be apparent to one of skill in the art in possession of the present disclosure. The TPM device 208 may include a TPM processing system (not illustrated, but which may be similar to the processor 102 discussed above with reference to FIG. 1) and a TPM memory system (not illustrated, but which may be similar to the memory 114 discussed above with reference to FIG. 1) that is coupled to the TPM processing system and that includes instructions that, when executed by the TPM processing system, cause the TPM processing system to provide a TPM engine 208a that is configured to perform the functionality of the TPM engines, TPM subsystems, and/or TPM devices discussed below.

The TPM device 208 may also include a TPM storage device (not illustrated, but which may be provided by any of a variety of TPM storage components that would be apparent to one of skill in the art in possession of the present disclosure) that is coupled to the TPM engine 208a (e.g., via a coupling between the TPM storage device and the TPM processing system) and that includes a TPM database 208b that is configured to store any of the information utilized by the TPM engine 208a described below. For example, the TPM database 208b is described below as including one or more Platform Configuration Registers (PCRs) in the TPM device 208, but one of skill in the art in possession of the present disclosure will appreciate how other TPM storage elements will fall within the scope of the present disclosure as well.

As illustrated, the chassis 202 may also house a DC-SCM device 210 that is coupled to the HPM 204, each of the AICs 206a-206c, and the TPM device 208. In the illustrated embodiment, the DC-SCM device 210 includes a chassis 210a (e.g., a circuit board) that supports the components of the DC-SCM device 210, only some of which are illustrated and described below. For example, the chassis 210a may support a DC-SCM processing system (not illustrated, but which may be similar to the processor 102 discussed above with reference to FIG. 1 and may include any of a variety of DC-SCM processing components that would be apparent to one of skill in the art in possession of the present disclosure) and a DC-SCM memory system (not illustrated, but which may be similar to the memory 114 discussed above with reference to FIG. 1, and may include any of a variety of DC-SCM memory components that would be apparent to one of skill in the art in possession of the present disclosure) that is coupled to the DC-SCM processing system.

In the embodiments illustrated and described below, the DC-SCM memory system includes instructions that, when executed by the DC-SCM processing system, cause the DC-SCM processing system to provide an initialization engine that is discussed below as being provided by a Basic Input/Output System (BIOS) engine 210b that is configured to perform the functionality of the BIOS engines, BIOS subsystems, and/or DC-SCM devices discussed below to, for example, provide hardware initialization for the DC-MHS computing device 200 during an initialization process (e.g., a Power-On Start-Up (POST) during a boot process), runtime services for an operating system and/or other applications/programs provided by the DC-MHS computing device 200, and/or any other BIOS functionality known in the art.

As will be appreciated by one of skill in the art in possession of the present disclosure, the BIOS engine 210b may be provided using BIOS code that is developed by a DC-MHS computing device manufacturer and that is configured to provide a BIOS that operates with hardware authorized by the DC-MHS computing device manufacturer, and that BIOS code and keys used to sign that BIOS code may be controlled by the DC-MHS computing device manufacturer. However, while illustrated and described as provided by a BIOS engine 210b that provides a BIOS, one of skill in the art in possession of the present disclosure will appreciate how the BIOS engine 210b may be provided by a Unified Extensible Firmware Interface (UEFI) engine that is provided according to the UEFI specification that defines an architecture of platform firmware used to initialize (e.g., boot) hardware in the DC-MHS computing device 200, as well as its interface for interaction with an operating system in the DC-MHS computing device 200, while remaining within the scope of the present disclosure as well.

The chassis 210a may also support a DC-SCM storage system (not illustrated, but which may be similar to the storage 108 discussed above with reference to FIG. 1 and may include any of a variety of DC-SCM storage components that would be apparent to one of skill in the art in possession of the present disclosure) that is coupled to the BIOS engine 210b (e.g., via a coupling between the DC-SCM storage system and the DC-SCM processing system) and that includes a BIOS database 210c that is configured to store any of the information utilized by the BIOS engine 210b discussed below.

In some embodiments, the chassis 202 may also house a DC-SCM authentication processing system (not illustrated, but which may be similar to the processor 102 discussed above with reference to FIG. 1) and a DC-SCM authentication memory system (not illustrated, but which may be similar to the memory 114 discussed above with reference to FIG. 1) that is coupled to the DC-SCM authentication processing system and that includes instructions that, when executed by the DC-SCM authentication processing system, cause the DC-SCM authentication processing system to provide a DC-SCM authentication engine 212 that is configured to perform the functionality of the DC-SCM authentication engines and DC-SCM authentication subsystems discussed below. As illustrated, the DC-SCM authentication engine 212 may be coupled to the TPM device 208 (e.g., via a coupling between the DC-SCM processing system and the TPM device 208) and the DC-SCM device 210 (e.g., via a coupling between the DC-SCM processing system and the DC-SCM device 210).

In some of the examples provided below, the DC-SCM authentication functionality of the present disclosure may be provided in the DC-MHS computing device 200 by the DC-SCM authentication engine 212 that may be provided by an operating system boot loader, an operating system, and/or other DC-SCM authentication engines that one of skill in the art in possession of the present disclosure would recognize as operating within the DC-MHS computing device 200 to provide the DC-SCM authentication functionality described below while being unaffected by any unauthenticated initialization operations (e.g., an unauthenticated boot).

However, in other examples, the chassis 202 may also house the optional communication system 214 illustrated in FIG. 2 that is coupled to the DC-SCM authentication engine 212 (e.g., via a coupling between the communication system 214 and the DC-SCM authentication processing system) and that may be provided by a Network Interface Controller (NIC) device, wireless communication components (e.g., Bluetooth communication components, Near Field Communication (NFC) components, etc.), and/or any other communication components that would be apparent to one of skill in the art in possession of the present disclosure. As discussed below, the optional communication system 214 and the DC-SCM authentication engine 212 may be utilized to couple a network-connected management system to the TPM device 208 and the DC-SCM device 210 to provide the network-based DC-SCM authentication functionality described below. As such, in some embodiments the DC-SCM authentication engine 212 described above as being provided by a DC-SCM authentication processing system/ memory system combination may instead be provided by communication components that provide a "pass-through" to allow the network-connected management system described above (and in further detail below) to perform the DC-SCM authentication functionality described below via the communication system 214.

However, while a specific DC-MHS computing device 200 has been illustrated and described, one of skill in the art in possession of the present disclosure will recognize that DC-MHS computing devices (or other devices operating according to the teachings of the present disclosure in a manner similar to that described below for the DC-MHS computing device 200) may include a variety of components and/or component configurations for providing conventional computing device functionality, as well as the DC-SCM authentication functionality discussed below, while remaining within the scope of the present disclosure as well.

Figure 3:
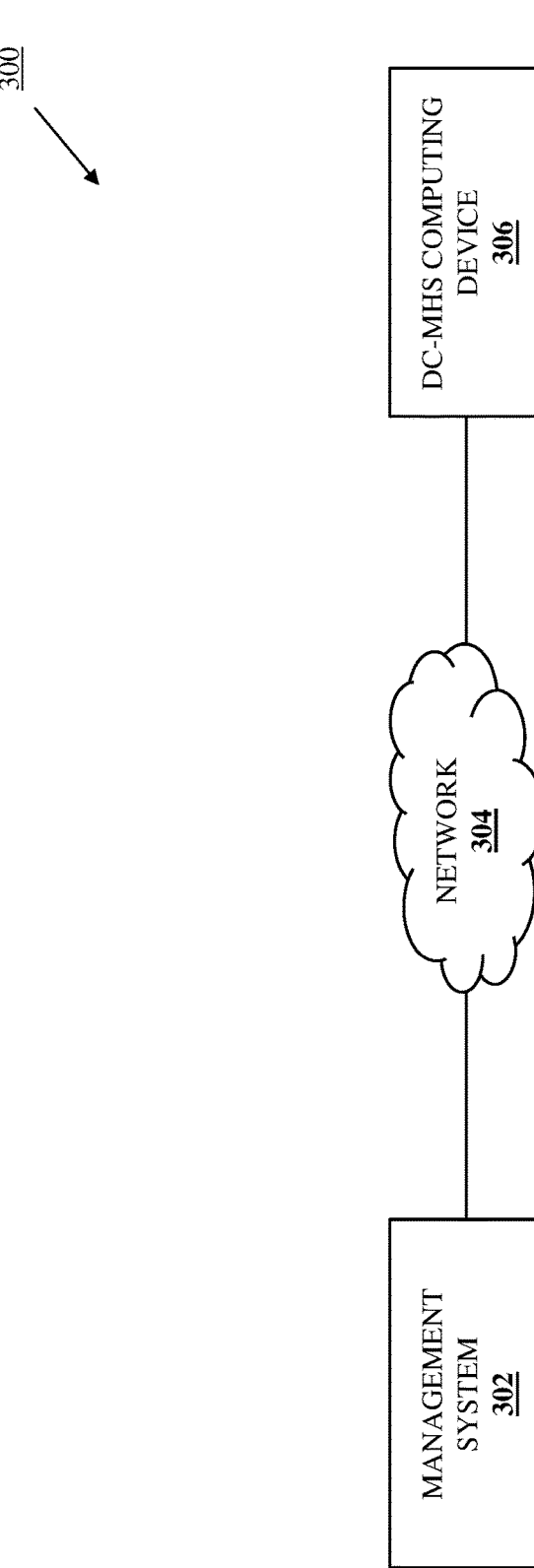
FIG. 3 is a schematic view illustrating an embodiment of a networked system that may include the DC-MHS computing device of FIG. 2 and may provide the DC-SCM authentication system of the present disclosure.

Referring now to FIG. 3, an embodiment of a networked system 300 is illustrated that may include the DC-MHS computing device 200 of FIG. 2 and may provide the DC-SCM authentication system of the present disclosure. In the illustrated embodiment, the networked system 300 includes a management system 302. In an embodiment, the management system 302 may be provided by the IHS 100 discussed above with reference to FIG. 1, and/or may include some or all of the components of the IHS 100, and in specific examples may be provided by one or more server devices. However, while illustrated and discussed as being provided by server device(s), one of skill in the art in possession of the present disclosure will recognize that management systems provided in the networked system 300 may include any devices that may be configured to operate similarly as the management system 302 discussed below.

As illustrated, the management system 302 may be coupled to a network 304 that may be provided by a Local Area Network (LAN), the Internet, combinations thereof, and/or any other network that would be apparent to one of skill in the art in possession of the present disclosure. Furthermore, a DC-MHS computing device 306 is coupled to the management system 302 via the network 304, and may be provided by the DC-MHS computing device 200 described above with reference to FIG. 2. As discussed below, in some embodiments the management system 302 may utilize the network 304 along with the optional communication system 214 and the DC-SCM authentication engine 212 in the DC-MHS computing device 200/306 to provide the network-based DC-SCM authentication functionality described below. However, while a specific networked system 300 has been illustrated and described, one of skill in the art in possession of the present disclosure will recognize that the networked systems provided according to the teachings of the present disclosure may include a variety of components and component configurations while remaining within the scope of the present disclosure as well.

Referring now to FIG. 4, an embodiment of a method 400 for authenticating a DC-SCM is illustrated. As discussed below, the systems and methods of the present disclosure verify whether an initialization process performed by a DC-SCM device for a computing device is an authenticated initialization process in order to authenticate the DC-SCM device. For example, DC-SCM authentication system of the present disclosure may include a DC-SCM authentication subsystem coupled to a DC-SCM device and a TPM device. The DC-SCM authentication subsystem retrieves a measured initialization process measurement generated by the TPM device during a first initialization process performed by the DC-SCM device, and retrieves a verified initialization process measurement that may be published by the DC-SCM device during or following the first initialization process as, for example a UEFI variable. The DC-SCM authentication subsystem then determines whether the measured initialization process measurement generated during by the TPM device the first initialization process does not match the verified initialization process measurement published by the DC-SCM device during or following the first initialization process and, if so, generates an unauthenticated DC-SCM device alert. As such, users of computing devices may be alerted when a non-authenticated DC-SCM device has been provided in their computing device.

The method 400 begins at block 402 where a DC-SCM device in a DC-MHS computing device is configured for DC-SCM authentication. In an embodiment, at block 402, the DC-SCM device 210 in the DC-MHS computing device 200 discussed above with reference to FIG. 2 may be configured for DC-SCM authentication. For example, at block 402, a BIOS developer or other entity in control of the DC-MHS computing device 200 may activate a verified initialization process mode (e.g., a "Boot Guard" mode in computing devices available from INTEL® Corporation of Santa Clara, California, United States; a Platform Secure Boot (PSB) mode in computing devices available from AMD® Inc. of Santa Clara, California, United States; etc.) in the DC-MHS computing device 200, and may enable the "pre-boot" and/or other initialization process measurements performed by the TPM device 208 as described in further detail below.

To provide a specific example, the verified initialization process mode activated at block 402 may configure the DC-MHS computing device 200 to perform hardware Root Of Trust (ROT) operations prior to the execution of BIOS code to verify that an Initial Boot Block (IBB) that will be executed by the BIOS engine 210b in the DC-SCM device 210 of the computing device 200 is authentic. Furthermore, the initialization process measurements enabled for the TPM device 208 may provide for the measurement of initialization process information (e.g., the IBB, at least one verified initialization process mode key (e.g., Boot Guard key(s) and associated information such as a Key Manifest (KM), a Boot Policy Manifest (BPM), etc.), executable BIOS code (e.g., BIOS firmware volumes), etc.) utilized to perform different stages of the initialization process, with a first initialization process sub-measurement followed by a plurality of subsequent initialization process sub-measurements that are each used to "extend" the most recent initialization process sub-measurement until a final initialization process measurement is generated and stored (e.g., in the Platform Configuration Register [0] (PCR[0])) in the TPM device 208. However, while a specific verified initialization process mode and initialization process measurements are described herein, one of skill in the art in possession of the present disclosure will appreciate how other verified initialization process modes and/or initialization process measurements will fall within the scope of the present disclosure as well.

Furthermore, at block 402, the developer or other entity in control of the initialization code (e.g., BIOS code that provides the BIOS engine 210b in the DC-SCM device 210 of the DC-MHS computing device 200) may also configure that initialization code with a verified initialization process measurement. In an embodiment, during a BIOS development process (e.g., for a BIOS engine 210b that will be initially provided for the DC-SCM device 210 in the DC-MHS computing device 200, for an update to the BIOS engine 210b that was previously provided for the DC-SCM device 210 in the DC-MHS computing device 200, etc.), a verified initialization process measurement may be generated for the BIOS that will be provided by the BIOS engine 210b, and may be stored with the BIOS code that will be used to provide the BIOS engine 210b (e.g., in the BIOS database 210c).

For example, upon finalization of authentic BIOS code for the BIOS engine 210b for any particular BIOS release (e.g., an initial BIOS release, a BIOS update, etc.), that authentic BIOS code may be utilized to provide a BIOS engine (e.g., similar to the BIOS engine 210*b*) that performs the initialization process that is required to initialize the DC-MHS computing device 200 while a verified initialization process mode is enabled and a TPM device (e.g., similar to the TPM device 208) performs the initialization process measurement operations described above. As will be appreciated by one of skill in the art in possession of the present disclosure, each of the initialization process sub-measurement operations/ initialization process sub-measurement extension operations described below may be performed using a hashing operation (e.g., a Secure Hash Algorithm 256-bit (SHA-256) hashing operation) on the initialization information used in the portion of the initialization process being measured, as well as any other measurement techniques that would be apparent to one of skill in the art in possession of the present disclosure.

As will be appreciated by one of skill in the art in possession of the present disclosure, such initialization process measurement operations on authentic BIOS code while the verified initialization process mode is enabled may include performing first initialization process sub-measurement operations on a first portion of the authentic BIOS code in order to generate a first initialization process sub-measurement, performing a second initialization process sub-measurement operation on the first initialization process sub-measurement and a second portion of the authentic BIOS code (e.g., a first BIOS firmware volume) in order to "extend" the first initialization process sub-measurement by generating a first intermediate initialization process sub-measurement, performing a third initialization process sub-measurement operation on the first intermediate initialization process sub-measurement and a third portion of the authentic BIOS code (e.g., a second BIOS firmware volume) in order to "extend" the first intermediate initialization process sub-measurement by generating a second intermediate initialization process sub-measurement, and so on until a final initialization process sub-measurement operation is performed on a most recent intermediate initialization process sub-measurement and a final portion of the authentic BIOS code (e.g., a final BIOS firmware volume) in order to "extend" the most recent intermediate initialization process sub-measurement by generating the "final" verified initialization process measurement that one of skill in the art in possession of the present disclosure will appreciate provides a measurement that may be used to determine whether an initialization process performed by a BIOS engine utilized the authentic BIOS code (and thus whether the BIOS is authentic).

Following the generation of the verified initialization process measurement, the verified initialization process measurement may be signed with a private key controlled by the developer or other entity in control of the initialization code in order to generate a signed verified initialization process measurement, and that signed verified initialization process measurement may be provided in the BIOS database 210*c* included in the DC-SCM device 210 of the DC-MHS computing device 200 with the authentic BIOS code. To provide a specific example, the signed verified initialization process measurement may be stored in a data region in a BIOS image in a UEFI variable format (e.g., in a BIOS Serial Peripheral Interface (SPI) storage device during the BIOS build process). As such, following block 402, the BIOS database 210*c* may store a "final" BIOS image with the signed verified initialization process measurement described above. However, while a specific example of the generation and storage of the verified initialization process measurement has been described, one of skill in the art in possession of the present disclosure will appreciate how the verified initialization process measurement utilized in the DC-SCM authentication system of the present disclosure may be generated and stored in a variety of manners that will fall within the scope of the present disclosure as well.

In an embodiment, following block 402, a DC-SCM device authentication mode for the DC-MHS computing device 200 may be activated by enabling the verified initialization process mode in the DC-MHS computing device 200, and enabling the TPM device initialization process measurements of the BIOS provided by the DC-SCM device 210. As such, one of skill in the art in possession of the present disclosure will appreciate how the DC-SCM device authentication mode for the DC-MHS computing device 200 may be activated by a DC-MHS computing device manufacturer of the DC-MHS computing device 200 prior to providing that DC-MHS computing device 200 to a network administrator or other user of the DC-MHS computing device 200, may be activated by a network administrator or other user of the DC-MHS computing device 200 subsequent to receiving the DC-MHS computing device 200, and/or may be activated in any of a variety of other manners that would be apparent to one of skill in the art in possession of the present disclosure.

Figure 5:
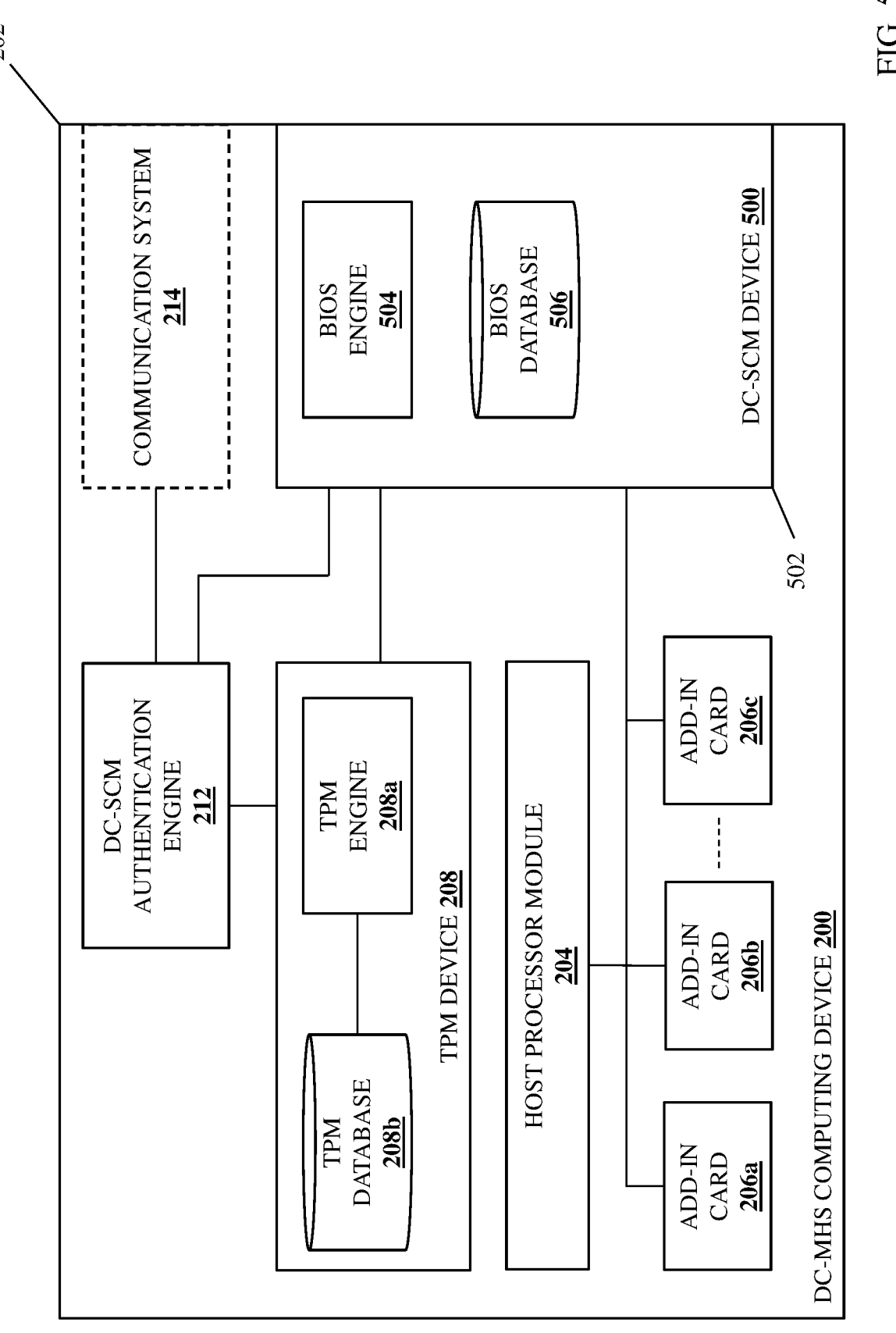
FIG. 5 is a schematic view illustrating an embodiment of the DC-MHS computing device FIG. 2 operating during the method of FIG. 4.

The method 400 may then proceed to optional block 404 where the DC-SCM device in the DC-MHS computing device may be replaced. With reference to FIG. 5, in an embodiment of optional block 404, the DC-SCM device 210 described above with reference to FIG. 2 may be replaced in the DC-MHS computing device 200 with a DC-SCM device 500. The remainder of the method 400 is illustrated and described below for a situation in which the DC-SCM 210 device has been replaced with the DC-SCM device 500 at optional block 404, while noting how the operations described below may differ when the DC-SCM 210 device is not replaced at optional block 404.

Similarly to the DC-SCM device 210 discussed above, the DC-SCM device 500 includes a chassis 502 (e.g., a circuit board) that supports the components of the DC-SCM device 500, only some of which are illustrated and described below. For example, the chassis 502 may support a DC-SCM processing system (not illustrated, but which may be similar to the processor 102 discussed above with reference to FIG. 1 and may include any of a variety of DC-SCM processing components that would be apparent to one of skill in the art in possession of the present disclosure) and a DC-SCM memory system (not illustrated, but which may be similar to the memory 114 discussed above with reference to FIG. 1, and may include any of a variety of DC-SCM memory components that would be apparent to one of skill in the art in possession of the present disclosure) that is coupled to the DC-SCM processing system.

In the embodiments illustrated and described below, the DC-SCM memory system includes instructions that, when executed by the DC-SCM processing system, cause the DC-SCM processing system to provide an initialization engine that is discussed below as being provided by a BIOS engine 504 that is configured to perform the functionality of the BIOS engines, BIOS subsystems, and/or DC-SCM devices discussed below to, for example, provide hardware initialization for the DC-MHS computing device 200 during an initialization process (e.g., a POST during a boot process), runtime services for an operating system and/or other applications/programs provided by the DC-MHS computing device 200, and/or any other BIOS functionality known in the art. However, while illustrated and described as provided by a BIOS engine 504 that provides a BIOS, one of skill in the art in possession of the present disclosure will appreciate how the BIOS engine 504 may be provided by a UEFI engine that is provided according to the UEFI specification that defines an architecture of platform firmware used to initialize (e.g., boot) hardware in the DC-MHS computing device 200, as well as its interface for interaction with an operating system in the DC-MHS computing device 200, while remaining within the scope of the present disclosure as well.

The chassis 502 may also support a DC-SCM storage system (not illustrated, but which may be similar to the storage 108 discussed above with reference to FIG. 1 and may include any of a variety of DC-SCM storage components that would be apparent to one of skill in the art in possession of the present disclosure) that is coupled to the BIOS engine 504 (e.g., via a coupling between the DC-SCM storage system and the DC-SCM processing system) and that includes a BIOS database 506 that is configured to store any of the information utilized by the BIOS engine 504 discussed below.

As will be appreciated by one of skill in the art in possession of the present disclosure, the DC-SCM device 500 that may replace the DC-SCM device 210 at optional block 404 may be an unauthentic DC-SCM device. For example, the DC-SCM device 500 may be a DC-SCM device provided by a DC-SCM device manufacturer or provider other than the DC-MHS computing device manufacturer or provider that provided the DC-MHS computing device 200 (e.g., the DC-SCM device 500 may be provided by the HEWLETT PACKARD® Company of Palo Alto, California, United States, while the DC-MHS computing device 200 may be manufactured by DELL® Inc. of Round Rock, Texas, United States). As such, in some embodiments the replacement of the DC-SCM device 210 with the DC-SCM device 500 may be a non-malicious DC-SCM device replacement that is simply performed to utilize a different DC-SCM device with the DC-MHS computing device 200.

However, in another example, the DC-SCM device 500 may be a DC-SCM device that has been modified by a hacker or other malicious actor that has replaced the DC-SCM device 210 with the DC-SCM device 500 in order to gain unauthorized access to data handled by the DC-MHS computing device 200. In the specific examples provided below, the DC-SCM device 500 is described as having been modified by a hacker or other malicious actor by copying the BIOS code utilized by the BIOS engine 210b from the BIOS database 210c, modifying that BIOS code to enable unauthorized access to data handled by the DC-MHS computing device 200 following its initialization, and providing that BIOS code in the BIOS database 506 for use by the BIOS engine 504 of the DC-SCM device 500. However, while specific scenarios have been described in which the DC-SCM device 210 is replaced in the DC-MHS computing device 200, one of skill in the art in possession of the present disclosure will appreciate how the DC-SCM device 210 may be replaced for a variety of reasons that will fall within the scope of the present disclosure as well.

The method 400 then proceeds to block 406 where the DC-SCM device begins an initialization process for the DC-MHS computing device. In an embodiment, at block 406, the DC-MHS computing device 200 may be powered on, reset, rebooted, and/or otherwise initialized such that an initialization process for the DC-MHS computing device 200 begins, and one of skill in the art in possession of the present disclosure will appreciate how that initialization process may be performed through blocks 408 and 410 described below until its completion at decision block 412.

Figure 6:
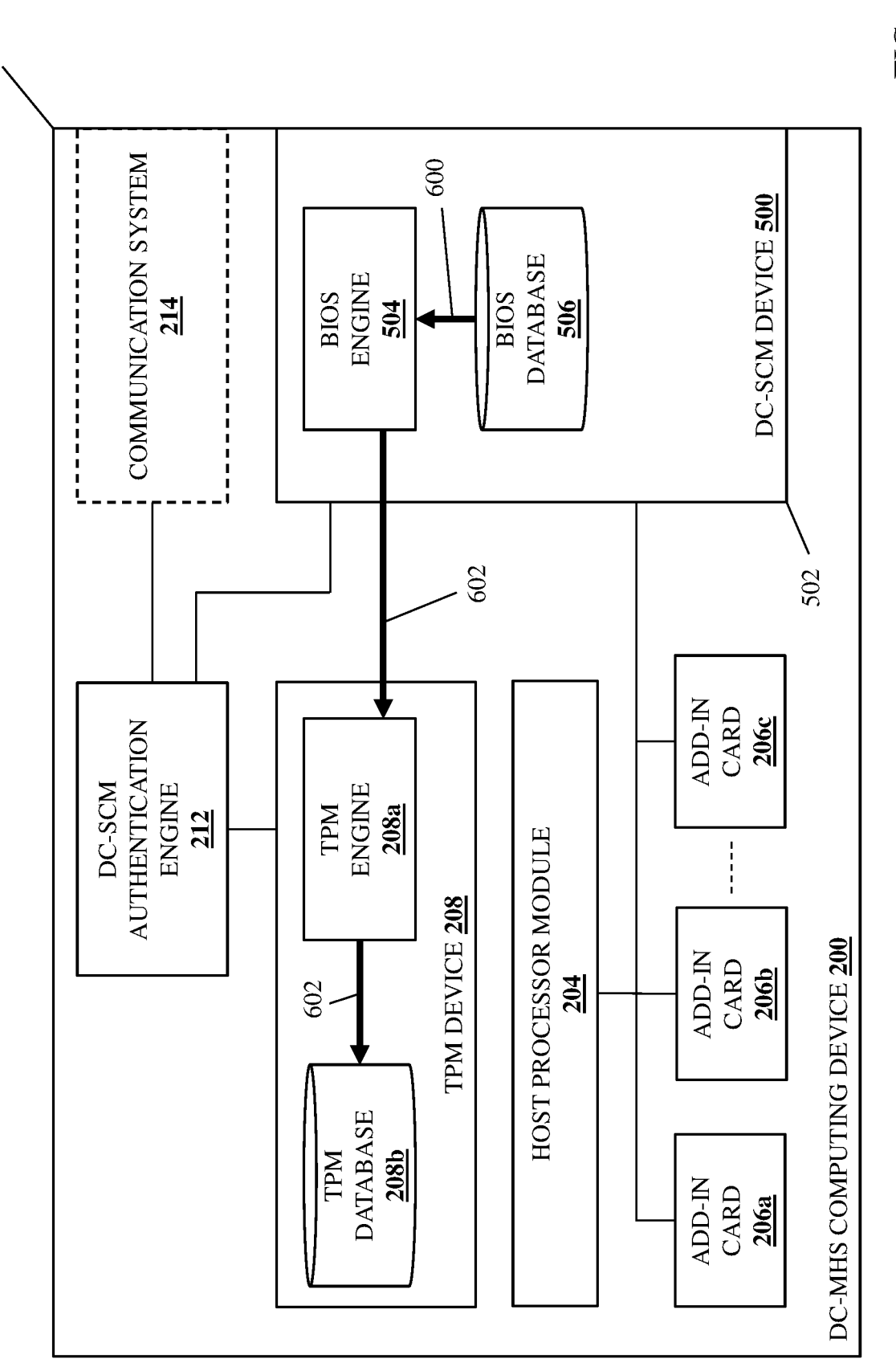
FIG. 6 is a schematic view illustrating an embodiment of the DC-MHS computing device FIG. 2 operating during the method of FIG. 4.

With reference to FIG. 6, in an embodiment of block 406, the BIOS engine 504 in the DC-SCM device 500 that replaced the DC-SCM device 210 at optional block 404 may perform first initialization information retrieval operations 600 that may include retrieving first initialization information from the BIOS database 506 that is configured for use in performing a first portion of the initialization process for the DC-MHS computing device 200, and then performing the first portion of the initialization process using the first initialization information.

As will be appreciated by one of skill in the art in possession of the present disclosure, the first initialization information retrieval operations 600 may be performed at the beginning of the initialization process for the DC-MHS computing device 200 and may include retrieving the first initialization information from the BIOS database 506 that includes the IBB and the verified initialization process mode key(s) (e.g., Boot Guard key(s) and associated information such as a Key Manifest (KM), a Boot Policy Manifest (BPM), etc.) discussed above.

The method 400 then proceeds to block 408 where a TPM device generates a measured initialization process measurement. With continued reference to FIG. 6, in an embodiment of block 408, the TPM engine 208a in the TPM device 208 may perform initialization process measurement operations 600 that include retrieving the first initialization information from the BIOS engine 504, using that first initialization information to generate a first measured initialization process sub-measurement (e.g., performing a hashing operation (e.g., a SHA-256 hashing operation) on the first initialization information to generate the first measured initialization process sub-measurement), and storing that first measured initialization process sub-measurement in the TPM database 208b (e.g., in the PCR[0] discussed above).

Figure 7:
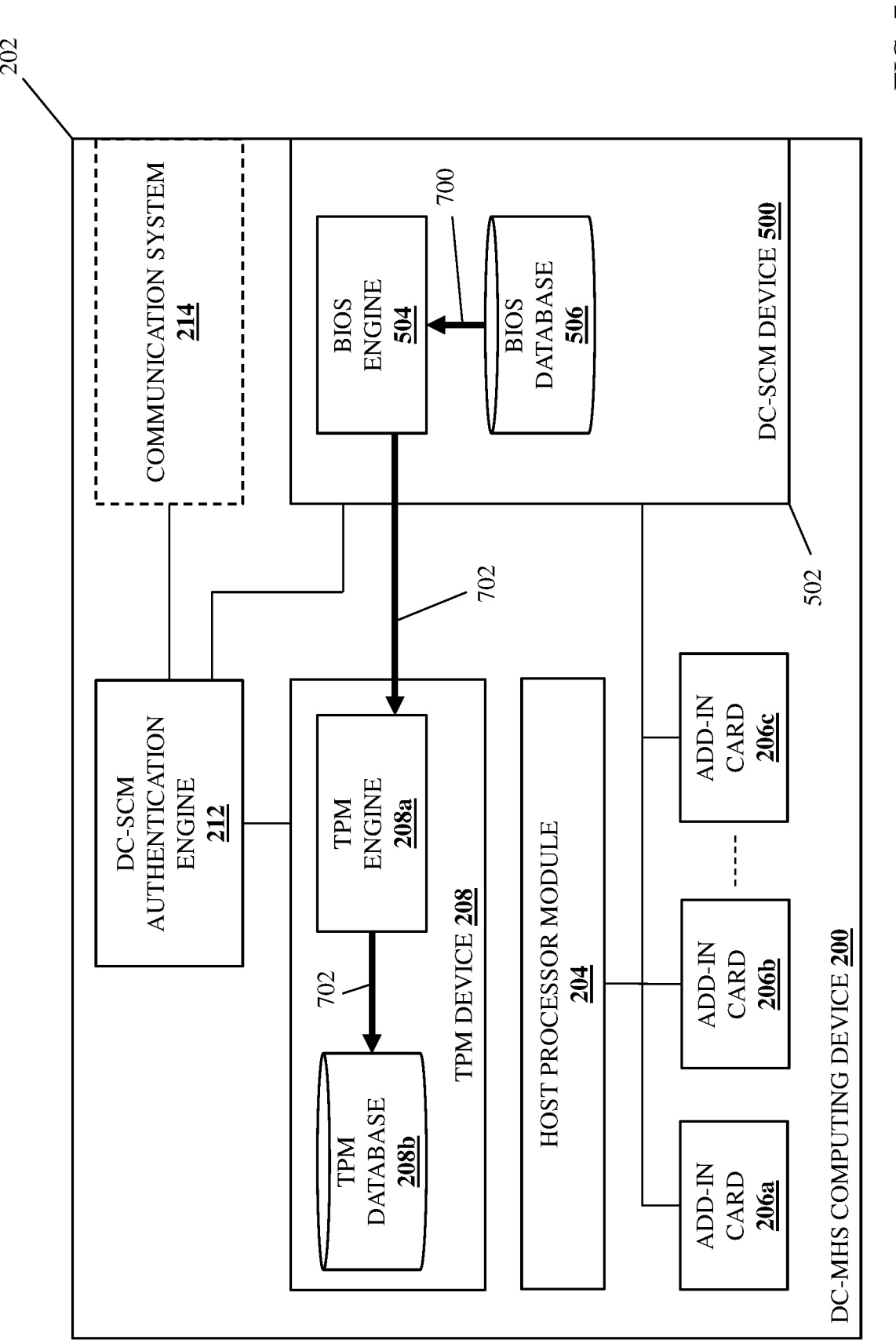
FIG. 7 is a schematic view illustrating an embodiment of the DC-MHS computing device FIG. 2 operating during the method of FIG. 4.

The method 400 then proceeds to block 410 where the TPM device updates the measured initialization process measurement. With reference to FIG. 7, in one or more embodiments of block 410, the BIOS engine 504 in the DC-SCM device 500 that replaced the DC-SCM device 210 at optional block 404 may perform subsequent initialization information retrieval operations 700 that may each include retrieving subsequent initialization information from the BIOS database 506 that is configured for use in performing any of a plurality of subsequent portions of the initialization process for the DC-MHS computing device 200 (e.g., following the first portion of the initialization process for the DC-MHS computing device 200 described above), and then performing that subsequent portion of the initialization process using that subsequent initialization information. As will be appreciated by one of skill in the art in possession of the present disclosure, the subsequent initialization information retrieval operations 700 may be performed throughout the remainder of the initialization process for the DC-MHS computing device 200 and may include retrieving subsequent initialization information that includes any of the BIOS firmware volumes discussed above.

With continued reference to FIG. 7, in an embodiment of block 410, the TPM engine 208a in the TPM device 208 may then perform initialization process measurement update operations 702 that include retrieving the subsequent initialization information from the BIOS engine 504, and using that subsequent initialization information to generate an updated measured initialization process sub-measurement (e.g., performing a hashing operation on that subsequent initialization information and a current measured initialization process sub-measurement stored in the PCR[0] (e.g., the first measured initialization process sub-measurement in this first performance of block 410)), and storing that updated measured initialization process sub-measurement in the TPM database 208*b* (e.g., in the PCR[0] discussed above) such that that updated measured initialization process sub-measurement becomes the current measured initialization process sub-measurement in any subsequent performance of block 410 that is not the final performance of block 410.

The method 400 then proceeds to decision block 412 where the method 400 proceeds depending on whether the initialization process measurement has completed. If, at decision block 412, the initialization process measurement has not completed, the method 400 returns to block 410. As such, similarly as discussed above, following the performance of the first initialization process sub-measurement operation on the first portion of the BIOS code (e.g., the IBB, verified initialization process mode key(s), etc.) retrieved by the BIOS engine 504 to generate the first initialization process sub-measurement, and the performance of the second initialization process sub-measurement operation on the first initialization process sub-measurement and a second portion of the BIOS code (e.g., a first BIOS firmware volume) retrieved by the BIOS engine 504 in order to "extend" the first initialization process sub-measurement by generating a first intermediate initialization process sub-measurement that is stored in the TPM database 208*b* (e.g., in the PCR[0] discussed above), decision block 412 may cause block 410 to repeat each time subsequent initialization information (e.g., respective BIOS firmware volumes) that is configured for use in performing any of the remainder of the plurality of subsequent portions of the initialization process for the DC-MHS computing device 200 is retrieved from the BIOS database 506.

As such, the subsequent performance of block 410 may include performing a third initialization process sub-measurement operation on the first intermediate initialization process sub-measurement and a third portion of the BIOS code (e.g., a second BIOS firmware volume) retrieved by the BIOS engine 504 in order to "extend" the first intermediate initialization process sub-measurement by generating a second intermediate initialization process sub-measurement that is stored in the TPM database 208*b* (e.g., in the PCR[0] discussed above), and so on until a final initialization process sub-measurement operation is performed on a most recently generated intermediate initialization process sub-measurement and a final portion of the BIOS code (e.g., a final BIOS firmware volume) retrieved by the BIOS engine 504 in order to "extend" that most recently generated intermediate initialization process sub-measurement by generating the "final" measured initialization process measurement that is stored in the TPM database 208*b* (e.g., in the PCR[0] discussed above). However, while specific initialization process measurement operations are described as being performed on the IBB/verified initialization process mode key(s) and respective BIOS firmware volumes, one of skill in the art in possession of the present disclosure will appreciate how such initialization process measurement operations may be performed on other initialization information (e.g., fixed Advanced Configuration and Power Interface (ACPI) information) while remaining within the scope of the present disclosure as well.

Figure 8A:
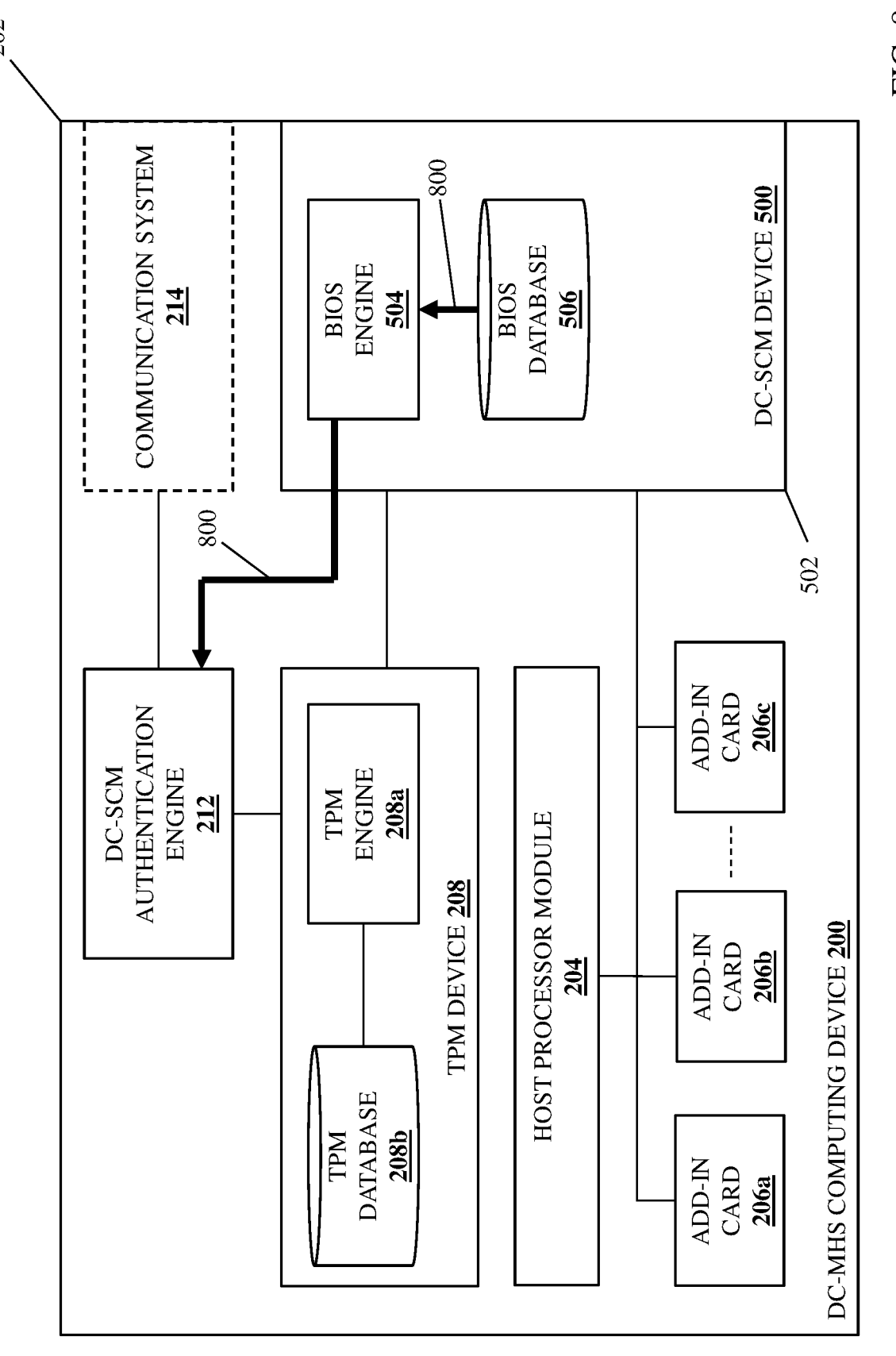
FIG. 8A is a schematic view illustrating an embodiment of the DC-MHS computing device FIG. 2 operating during the method of FIG. 4.

If, at decision block 412, the initialization process measurement has completed, the method 400 proceeds to block 414 where a DC-SCM authentication subsystem retrieves a verified initialization process measurement from the DC-SCM device. With reference to FIG. 8A, in an embodiment of block 414 and following the generation of the "final" measured initialization process measurement as described above, the DC-SCM authentication engine 212 in the DC-MHS computing device 200 may perform verified initialization process measurement retrieval operations 800 that include retrieving the verified initialization process measurement from the BIOS database 506 (e.g., reading the verified initialization process measurement that was stored in the BIOS database 506 by the BIOS developer as described above) via the BIOS engine 504 as illustrated, directly, and/or using other techniques that would be apparent to one of skill in the art in possession of the present disclosure.

In a specific example, the verified initialization process measurement may be presented to the DC-SCM authentication engine 212 as a UEFI variable, which one of skill in the art in possession of the present disclosure will appreciate may allow easier access to the verified initialization process measurement by an operating system provided in the DC-MHS computing device 200 during the initialization process for the DC-MHS computing device 200. Furthermore, as described above, the verified initialization process measurement may be a signed verified initialization process measurement (i.e., a verified initialization process measurement signed with a private key controlled by the developer or other entity in control of the initialization code), and one of skill in the art in possession of the present disclosure will appreciate how the DC-SCM authentication engine 212 may use a public key of the developer or other entity in control of the initialization code to verify the signed verified initialization process measurement at block 414.

Figure 8B:
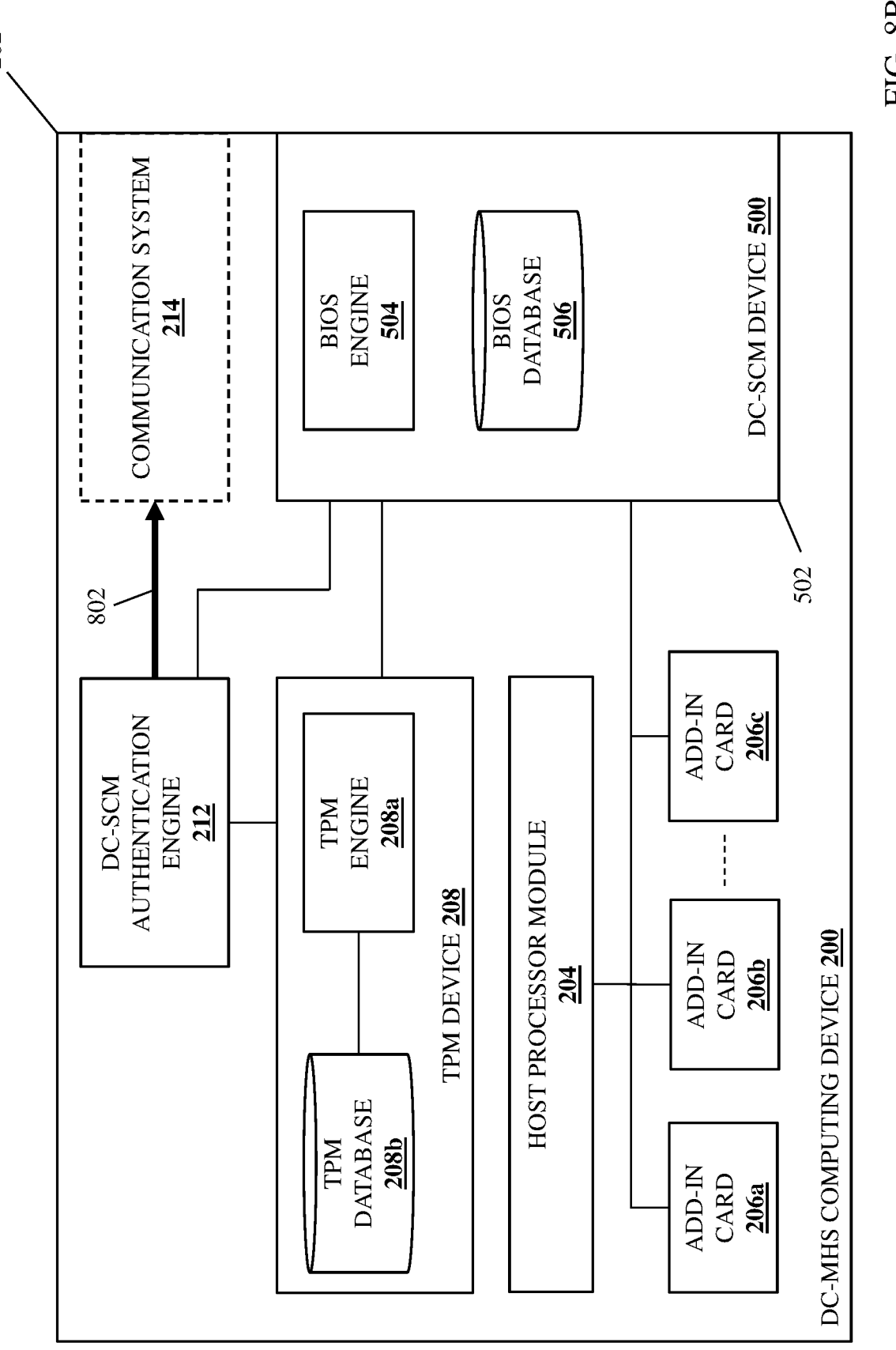
FIG. 8B is a schematic view illustrating an embodiment of the DC-MHS computing device FIG. 2 operating during the method of FIG. 4.
Figure 8C:
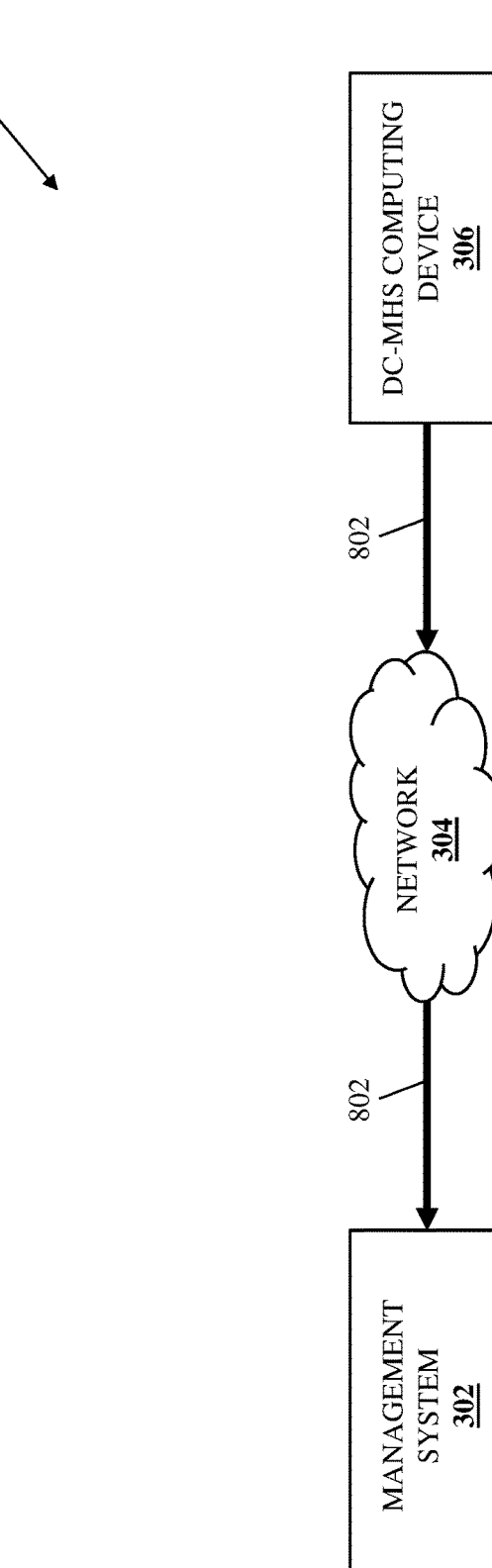
FIG. 8C is a schematic view illustrating an embodiment of the networked system FIG. 3 operating during the method of FIG. 4.

However, while FIG. 8A illustrates the retrieval of the verified initialization process measurement by a DC-SCM authentication engine 212 provided in the DC-MHS computing device 200, one of skill in the art in possession of the present disclosure will appreciate how the verified initialization process measurement may be retrieved from a remote location while remaining within the scope of the present disclosure as well. For example, FIGS. 8B and 8C illustrate how the management system 302 may perform verified initialization process measurement retrieval operations 802 through the network 304 and via the communication system 214 in the DC-MHS computing device 200/306 that allow the management device 302 to retrieve the verified initialization process measurement at block 414 as well (e.g., using the verified initialization process measurement retrieval operations 800 described above that may be enabled by the "pass-through" DC-SCM authentication engine 212 described above).

Figure 9A:
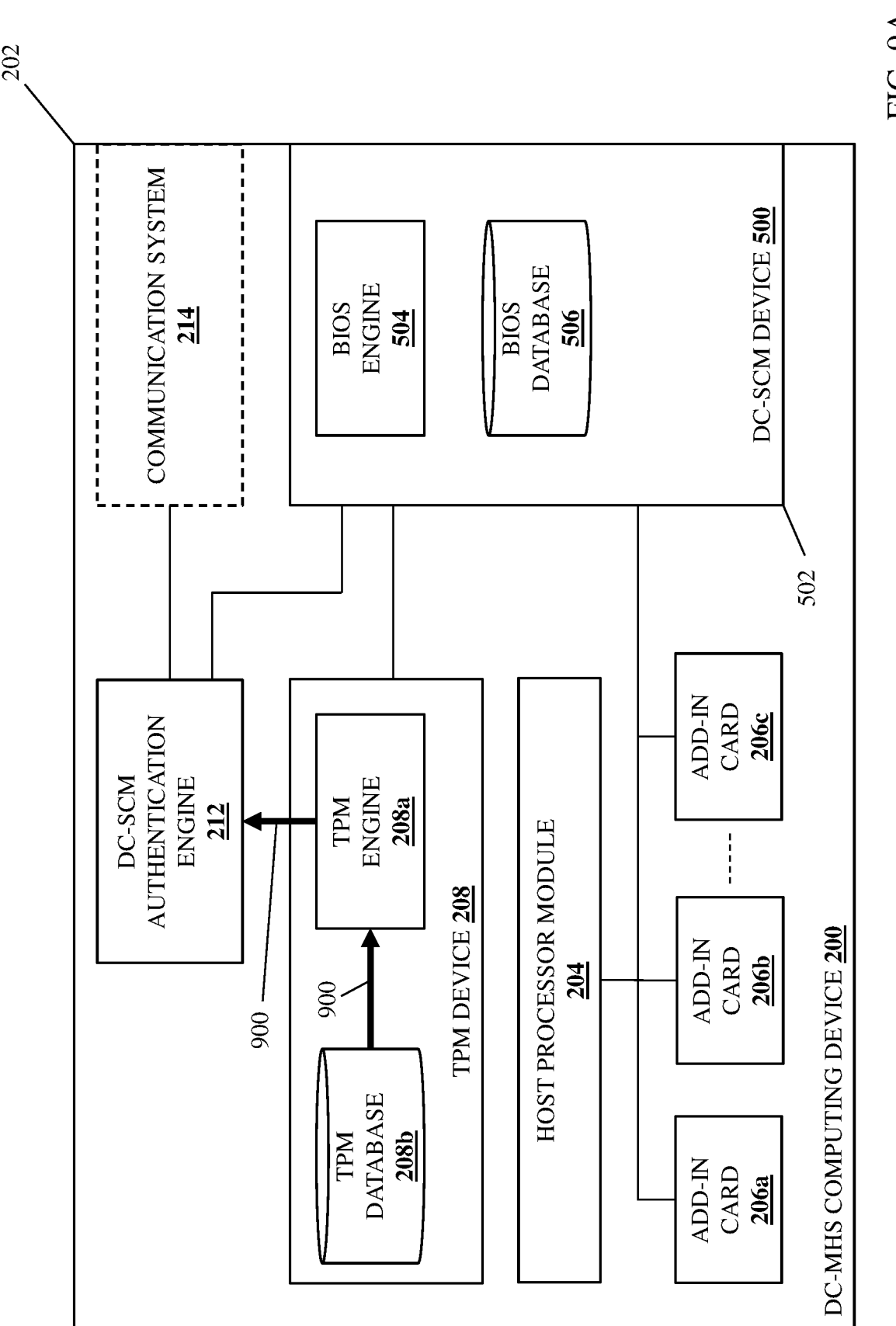
FIG. 9A is a schematic view illustrating an embodiment of the DC-MHS computing device FIG. 2 operating during the method of FIG. 4.

The method 400 then proceeds to block 416 where the DC-SCM authentication subsystem retrieves the measured initialization process measurement from the TPM device. With reference to FIG. 9A, in an embodiment of block 416, the DC-SCM authentication engine 212 in the DC-MHS computing device 200 may perform measured initialization process measurement retrieval operations 900 that include retrieving the "final" measured initialization process measurement from the TPM database 208*b* (e.g., from the PCR[0] as described above) via the TPM engine 208*a* as illustrated, directly, and/or using other techniques that would be apparent to one of skill in the art in possession of the present disclosure.

Figure 9B:
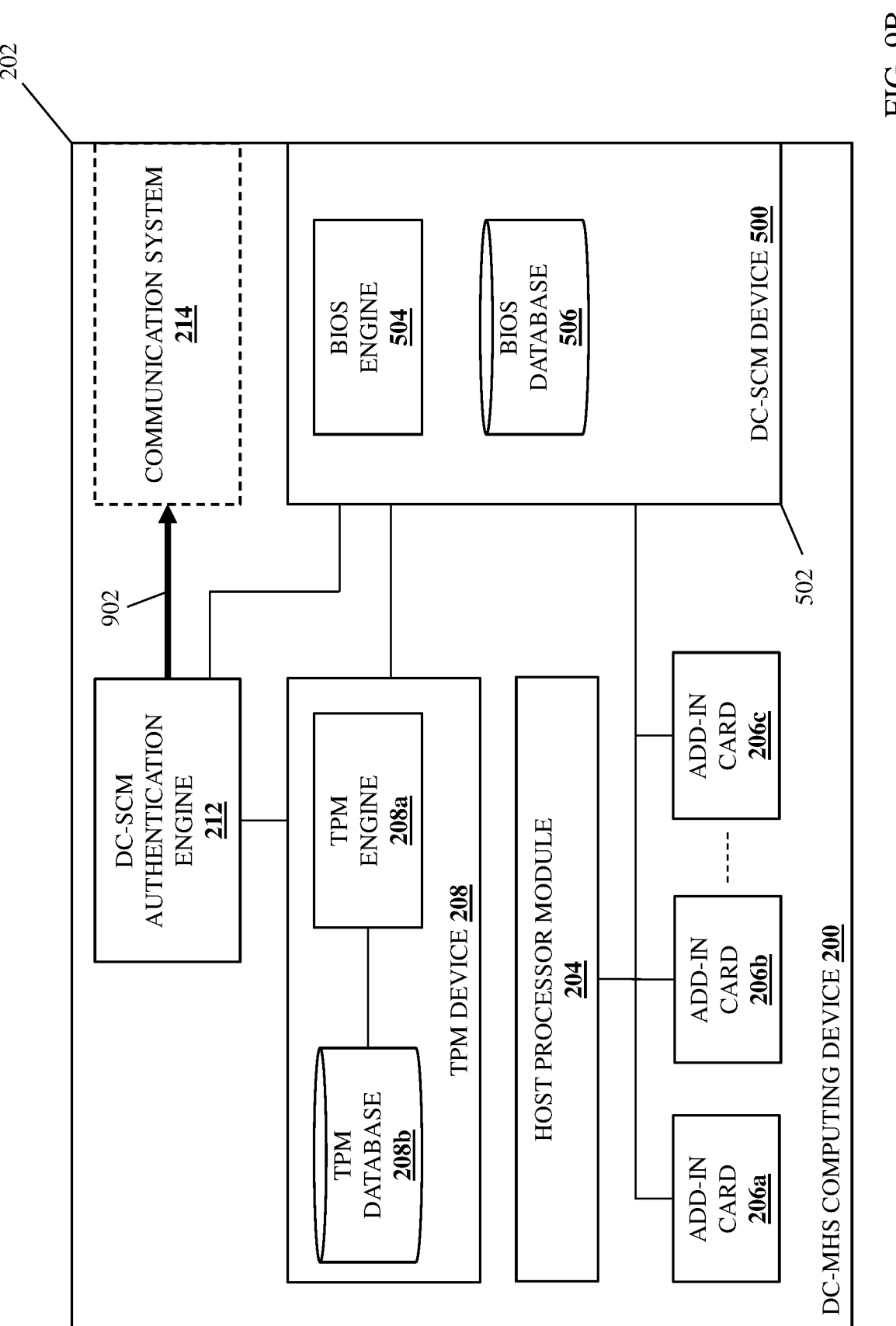
FIG. 9B is a schematic view illustrating an embodiment of the DC-MHS computing device FIG. 2 operating during the method of FIG. 4.
Figure 9C:
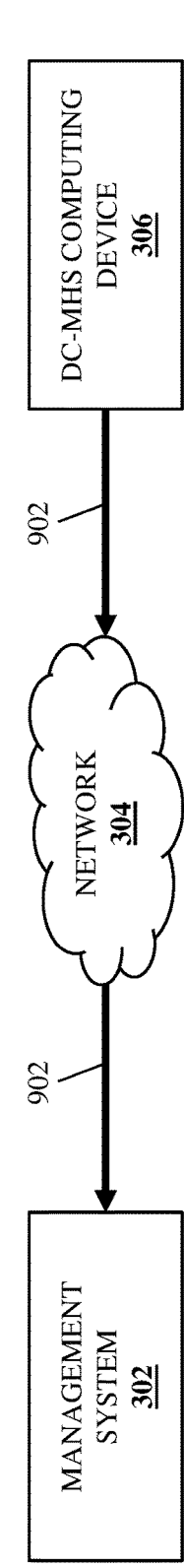
FIG. 9C is a schematic view illustrating an embodiment of the networked system FIG. 3 operating during the method of FIG. 4.

However, while FIG. 9A illustrates the retrieval of the measured initialization process measurement by a DC-SCM authentication engine 212 provided in the DC-MHS computing device 200, one of skill in the art in possession of the present disclosure will appreciate how the measured initialization process measurement may be retrieved from a remote location while remaining within the scope of the present disclosure as well. For example, FIGS. 9B and 9C illustrate how the management system 302 may perform measured initialization process measurement retrieval operations 902 through the network 304 and via the communication system 214 in the DC-MHS computing device 200/306 that allow the management device 302 to retrieve the measured initialization process measurement at block 416 as well (e.g., using the measured initialization process measurement retrieval operations 900 described above that may be enabled by the "pass-through" DC-SCM authentication engine 212 described above).

The method 400 then proceeds to decision block 418 where it is determined whether the measured initialization process measurement matches the verified initialization process measurement. In an embodiment, at decision block 418, the DC-SCM authentication engine 212 in the DC-MHS computing device 200 or the management device 302 may compare the measured initialization process measurement that was received at block 416 to the verified initialization process measurement that was retrieved at block 414 to determine whether they match. As will be appreciated by one of skill in the art in possession of the present disclosure, in the event the initialization process for the DC-MHS computing device 200 is performed by the BIOS engine 210b in the DC-SCM device 210 using the authentic BIOS code or other initialization information (e.g., the IBB, verified initialization process mode key(s), BIOS firmware volumes, etc.) described above, the measured initialization process measurement will match the verified initialization process measurement at decision block 418 as long as the verified initialization process mode is enabled in the DC-MHS computing device 200.

However, in the event the initialization process for the DC-MHS computing device 200 is performed by the BIOS engine 504 in the DC-SCM device 500 that replaced the DC-SCM device 210 at optional block 404, the initialization information used by that BIOS engine 504 to perform the initialization process will be different than the initialization information that was used to generate the verified initialization process measurement, and thus the measured initialization process measurement will not match the verified initialization process measurement at decision block 418.

Continuing with the example in which the DC-SCM device 500 was provided by a DC-SCM device manufacturer or provider other than the DC-MHS computing device manufacturer or provider that provided the DC-MHS computing device 200, any or all of the IBB, verified initialization process mode key(s), and BIOS firmware volumes in the BIOS code used by the BIOS engine 504 to perform the initialization process may differ from those in the authentic BIOS code that was used to generate the verified initialization process measurement as described above, and one of skill in the art in possession of the present disclosure will appreciate how the use of that BIOS code at blocks 408 and 410 will generate a measured initialization process measurement that will not match the verified initialization process measurement.

Furthermore, continuing with the example in which the DC-SCM device 500 was provided by a hacker or other malicious actor that copied the BIOS code utilized by the BIOS engine 210b from the BIOS database 210c while modifying that BIOS code to enable unauthorized access to data handled by the DC-MHS computing device 200 following its initialization, one of skill in the art in possession of the present disclosure will appreciate how the modification of that BIOS code to enable unauthorized access to data handled by the DC-MHS computing device 200 will result in the generation a measured initialization process measurement at blocks 408 and 410 that will not match the verified initialization process measurement. For example, in order to enable the unauthorized access to data handled by the DC-MHS computing device 200 following its initialization, the hacker or other malicious actor may need to modify the IBB and/or verified initialization process mode key(s) in the BIOS code that was copied from the BIOS database 210c, and one of skill in the art in possession of the present disclosure will appreciate how that modification will result in the generation of a measured initialization process measurement at blocks 408 and 410 that will not match the verified initialization process measurement.

As such, the matching of the measured initialization process measurement and the verified initialization process measurement while the verified initialization process mode is enabled in the DC-MHS computing device 200 may assure that verified initialization process mode key(s) (e.g., Boot Guard keys) in BIOS code that is used in an initialization process were provided by the DC-MHS computing device manufacturer, and thus that a BIOS and a DC-SCM device in that DC-MHS computing device that provides that BIOS was provided by that DC-MHS computing device manufacturer as well. However, while a few specific examples of modifications to initialization information have been described, one of skill in the art in possession of the present disclosure will appreciate how other initialization information modifications may be detected similarly as described above while remaining within the scope of the present disclosure as well.

If, at decision block 418, the measured initialization process measurement does not match the verified initialization process measurement, the method 400 proceeds to block 420 where the DC-SCM authentication subsystem generates an unauthenticated DC-SCM alert. As discussed above, if the verified initialization process mode is enabled in the DC-MHS computing device 200, then the measured initialization process measurement will match the verified initialization process measurement as long as the initialization information used to perform the initialization process for the DC-MHS computing device 200 has not changed. As such, the DC-SCM authentication engine 212 or the management device 302 may verify that the verified initialization process mode is enabled in the DC-MHS computing device 200 (e.g., via a Machine-Specific Register (MSR)) and, if the measured initialization process measurement does not match the verified initialization process measurement, generate the unauthenticated DC-SCM alert.

In some embodiments, at block 420 and in response to verifying that the verified initialization process mode is enabled in the DC-MHS computing device 200 and determining that the measured initialization process measurement does not match the verified initialization process measurement at decision block 418, the DC-SCM authentication engine 212 in the DC-MHS computing device 200 may generate an unauthenticated DC-SCM alert and provide that DC-SCM alert for display (e.g., on a display device such as the display 110 discussed above with reference to FIG. 1 that may be included on or coupled to the DC-MHS computing device 200). In other embodiments, at block 420 and in response to verifying that the verified initialization process mode is enabled in the DC-MHS computing device 200 and determining that the measured initialization process measurement does not match the verified initialization process measurement at decision block 418, the management device 302 may generate an unauthenticated DC-SCM alert and provide that DC-SCM alert for display (e.g., on a display device such as the display 110 discussed above with reference to FIG. 1 that may be included on or coupled to the management device 302).

If, at decision block 418, the measured initialization process measurement matches the verified initialization process measurement, or following block 420, the method 400 may proceed to optional block 422 where the DC-MHS computing device may perform runtime operations. In an embodiment in which the measured initialization process measurement matched the verified initialization process measurement at decision block 418, at optional block 422 and following the performance of the initialization process by the BIOS engine 210b in the DC-SCM device 210, the DC-MHS computing device 200 will enter a runtime state (e.g., with an operating system in control of the DC-MHS computing device 200) and will perform any of a variety of runtime operations that would be apparent to one of skill in the art in possession of the present disclosure. In an embodiment in which the measured initialization process measurement did not match the verified initialization process measurement at decision block 418, the BIOS engine 504 in the DC-SCM device 500 may be allowed to perform the initialization process at optional block 422 such that the DC-MHS computing device 200 enters a runtime state (e.g., with an operating system in control of the DC-MHS computing device 200) and performs any of a variety of runtime operations that would be apparent to one of skill in the art in possession of the present disclosure.

Continuing with the example in which the DC-SCM device 500 was provided by a DC-SCM device manufacturer or provider other than the DC-MHS computing device manufacturer or provider that provided the DC-MHS computing device 200, a network administrator or other user that receives the unauthenticated DC-SCM alert may allow the DC-MHS computing device 200 to enter or continue in the runtime state and perform runtime operations, as that network administrator or other user may have replaced (or authorized replacement of) the DC-SCM device 210. However, continuing with the example in which the DC-SCM device 500 was provided by a hacker or other malicious actor. a network administrator or other user that receives the unauthenticated DC-SCM alert may prevent the DC-MHS computing device 200 from entering or continuing in the runtime state and performing runtime operations in order to prevent unauthorized access to data handling by the DC-MHS computing device 200 subsequent to its initialization.

As will be appreciated by one of skill in the art in possession of the present disclosure, in some embodiments the method 400 may be performed to allow the DC-MHS computing device 200 to be initialized via the initialization process described above, with the determination of whether the measured initialization process measurement matches the verified initialization process measurement made following that initialization process and during runtime operations such that any unauthenticated DC-SCM alerts are provided during those runtime operations. However, in other embodiments, the method 400 may be prior to initialization of the DC-MHS computing device 200 via the initialization process described above, with the determination of whether the measured initialization process measurement matches the verified initialization process measurement made at some point during that initialization process and prior to runtime operations such that any unauthenticated DC-SCM alerts are provided during the initialization process, and in some cases, used to prevent runtime operations by shutting down the DC-MHS computing device 200 during the initialization process in the event the measured initialization process measurement does not match the verified initialization process measurement.

Thus, systems and methods have been described that verify whether an initialization process performed by a DC-SCM device for a computing device is an authenticated initialization process in order to authenticate the DC-SCM device. For example, DC-SCM authentication system of the present disclosure may include a DC-SCM authentication subsystem coupled to a DC-SCM device and a TPM device. The DC-SCM authentication subsystem retrieves a measured initialization process measurement generated by the TPM device during a first initialization process performed by the DC-SCM device, and retrieves a verified initialization process measurement that may be published by the DC-SCM device during or following the first initialization process as, for example a UEFI variable. The DC-SCM authentication subsystem then determines whether the measured initialization process measurement generated during by the TPM device the first initialization process does not match the verified initialization process measurement published by the DC-SCM device during or following the first initialization process and, if so, generates an unauthenticated DC-SCM device alert. As such, the systems and methods of the present disclosure operate to authenticate an initialization process (e.g., by attesting that an initialization process perform by a BIOS uses authentic BIOS code) in order to authenticate the DC-SCM device that performs that initialization process.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A DataCenter Secure Control Module (DC-SCM) authentication system, comprising:
   a chassis that includes a DataCenter Secure Control Module (DC-SCM) device housing including a DC-SCM connector;
   a Host Processor Module (HPM) that is housed in the chassis and coupled to the DC-SCM connector;
   a first DC-SCM device that is provided in the DC-SCM device housing of the chassis to replace a second DC-SCM device and that is connected to the DC-SCM connector to couple to the HPM, wherein the first DC-SCM device includes a Basic Input Output System (BIOS) and a Baseboard Management Controller (BMC) subsystem and is configured to:
      perform, using the BMC subsystem, security operations for the HPM;
      perform, using the BIOS, first initialization process; and
      publish a verified initialization process measurement;
   a Trusted Platform Module (TPM) device that is housed in the chassis, coupled to the first DC-SCM device via the DC-SCM connector, and configured to:
      generate, during the first initialization process performed by the first DC-SCM device, a measured initialization process measurement; and
   a DC-SCM authentication subsystem that is housed in the chassis, coupled to the first DC-SCM device via the DC-SCM connector, and coupled to the TPM device, wherein the DC-SCM authentication subsystem is configured to:

retrieve, from the TPM device, the measured initialization process measurement generated by the TPM device during the first initialization process performed by the first DC-SCM device;

retrieve, from the first DC-SCM device, the verified initialization process measurement published by the first DC-SCM device during or following the first initialization process;

determine that the measured initialization process measurement generated during by the TPM device during the first initialization process does not match the verified initialization process measurement published by the first DC-SCM device during or following the first initialization process; and generate, in response to determining that the measured initialization process measurement generated by the TPM device during the first initialization process does not match the verified initialization process measurement published by the first DC-SCM device during or following the first initialization process, an unauthenticated DC-SCM device alert.

2. The system of claim 1, wherein the measured initialization process measurement is a final Platform Configuration Register (PCR) measurement generated by the TPM device using a plurality of initialization process sub-measurements that were each generated by the TPM device during a respective initialization operation performed by the first DC-SCM device during the first initialization process.

3. The system of claim 1, wherein the verified initialization process measurement is retrieved as a Unified Extensible Firmware Interface (UEFI) variable published by the first DC-SCM device during or following the first initialization process.

4. The system of claim 1, wherein the retrieving the verified initialization process measurement published by the first DC-SCM device during or following the first initialization process includes:

retrieving a private-key-signed initialization process measurement published by the first DC-SCM device during or following the first initialization process; and verifying the private-key-signed initialization process measurement with a public key to provide the verified initialization process measurement.

5. The system of claim 1, wherein the measured initialization process measurement includes:

an initialization process sub-measurement that was generated by the TPM device during a verified initialization process mode at a beginning of the first initialization process and that measures firmware used to perform a remainder of the first initialization process.

6. The system of claim 5, wherein the initialization process sub-measurement is a measurement of an Initial Boot Block (IBB) and at least one verified initialization process mode key.

7. The system of claim 1, wherein the DC-SCM authentication subsystem is provided by an operating system or an operating system boot loader.

8. An Information Handling System (IHS), comprising:

a chassis that includes a DataCenter Secure Control Module (DC-SCM) device housing including a DC-SCM connector;

a processing system that is housed in the chassis and coupled to the DC-SCM connector; and a memory system that is housed in the chassis, that is coupled to the processing system, and that includes instructions that, when executed by the processing system, cause the processing system to provide a DataCenter Secure Control Module (DC-SCM) authentication engine that is configured to:

retrieve, from a Trusted Platform Module (TPM) device that is housed in the chassis and coupled to the processing system and the DC-SCM connector, a measured initialization process measurement generated by the TPM device during a first initialization process performed by a first DC-SCM device that is provided in the DC-SCM device housing of the chassis to replace a second DC-SCM device, that is connected to the DC-SCM connector to couple to the processing system and the TPM device, that includes a Baseboard Management Controller (BMC) subsystem that is configured to perform security operations for a Host Processor Module (HPM) that is housed in the chassis, and that includes a Basic Input Output System (BIOS) that is configured to perform the first initialization process;

retrieve, from the first DC-SCM device, a verified initialization process measurement published by the first DC-SCM device during or following the first initialization process;

determine that the measured initialization process measurement generating by the TPM device during the first initialization process does not match the verified initialization process measurement published by the first DC-SCM device during or following the first initialization process; and generate, in response to determining that the measured initialization process measurement generated by the TPM device during the first initialization process does not match the verified initialization process measurement published by the first DC-SCM device during or following the first initialization process, an unauthenticated DC-SCM device alert.

9. The IHS of claim 8, wherein the measured initialization process measurement is a final Platform Configuration Register (PCR) measurement generated by the TPM device using a plurality of initialization process sub-measurements that were each generated by the TPM device during a respective initialization operation performed by the first DC-SCM device during the first initialization process.

10. The IHS of claim 8, wherein the verified initialization process measurement is retrieved as a Unified Extensible Firmware Interface (UEFI) variable published by the first DC-SCM device during or following the first initialization process.

11. The IHS of claim 8, wherein the retrieving the verified initialization process measurement published by the first DC-SCM device during or following the first initialization process includes:

retrieving a private-key-signed initialization process measurement published by the first DC-SCM device during or following the first initialization process; and verifying the private-key-signed initialization process measurement with a public key to provide the verified initialization process measurement.

12. The IHS of claim 8, wherein the measured initialization process measurement includes:

an initialization process sub-measurement that was generated by the TPM device during a verified initialization process mode at a beginning of the first initialization process and that measures firmware used to perform a remainder of the first initialization process.

13. The IHS of claim 8, wherein the initialization process sub-measurement is a measurement of an Initial Boot Block (IBB) and at least one verified initialization process mode key.

14. A method for authenticating a DataCenter Secure Control Module (DC-SCM), comprising:

retrieving, by a DataCenter Secure Control Module (DC-SCM) authentication subsystem that is housed in a chassis and coupled to a DC-SCM connector included in a DC-SCM device housing included in the chassis from a Trusted Platform Module (TPM) device that is housed in the chassis and coupled to the DC-SCM authentication subsystem and the DC-SCM connector, a measured initialization process measurement generated by the TPM device during a first initialization process performed by a first DC-SCM device that is provided in the DC-SCM device housing of the chassis to replace a second DC-SCM device, that is connected to the DC-SCM connector to couple to the DC-SCM authentication subsystem and the TPM device, that includes a Baseboard Management Controller (BMC) subsystem that is configured to perform security operations for a Host Processor Module (HPM) that is housed in the chassis, and that includes a Basic Input Output System (BIOS) that is configured to perform the first initialization process;

retrieving, by the DC-SCM authentication subsystem from the first DC-SCM device, a verified initialization process measurement published by the first DC-SCM device during or following the first initialization process;

determining, by the DC-SCM authentication subsystem, that the measured initialization process measurement generating by the TPM device during the first initialization process does not match the verified initialization process measurement published by the first DC-SCM device during or following the first initialization process; and generating, by the DC-SCM authentication subsystem in response to determining that the measured initialization process measurement generated by the TPM device during the first initialization process does not match the verified initialization process measurement published by the first DC-SCM device during or following the first initialization process, an unauthenticated DC-SCM device alert.

15. The method of claim 14, wherein the measured initialization process measurement is a final Platform Configuration Register (PCR) measurement generated by the TPM device using a plurality of initialization process sub-measurements that were each generated by the TPM device during a respective initialization operation performed by the first DC-SCM device during the first initialization process.

16. The method of claim 14, wherein the verified initialization process measurement is retrieved as a Unified Extensible Firmware Interface (UEFI) variable published by the first DC-SCM device during or following the first initialization process.

17. The method of claim 14, wherein the retrieving the verified initialization process measurement published by the first DC-SCM device during or following the first initialization process includes:

retrieving a private-key-signed initialization process measurement published by the first DC-SCM device during or following the first initialization process; and verifying the private-key-signed initialization process measurement with a public key to provide the verified initialization process measurement.

18. The method of claim 14, wherein the measured initialization process measurement includes:

an initialization process sub-measurement that was generated by the TPM device during a verified initialization process mode at a beginning of the first initialization process and that measures firmware used to perform a remainder of the first initialization process.

19. The method of claim 14, wherein the initialization process sub-measurement is a measurement of an Initial Boot Block (IBB) and at least one verified initialization process mode key.

20. The method of claim 14, wherein the DC-SCM authentication subsystem is provided by an operating system or an operating system boot loader.

\* \* \* \* \*